(12) United States Patent
Geiger

(10) Patent No.: US 7,051,526 B2
(45) Date of Patent: May 30, 2006

(54) CLOSED-SYSTEM ELECTROHYDRAULIC ACTUATOR

(75) Inventor: David Geiger, Orchard Park, NY (US)

(73) Assignee: Moog Inc., East Aurora, NY (US)

( * ) Notice: Subject to any disclaimer, the term of this patent is extended or adjusted under 35 U.S.C. 154(b) by 15 days.

(21) Appl. No.: 10/957,365

(22) Filed: Oct. 1, 2004

(65) Prior Publication Data
US 2006/0070378 A1 Apr. 6, 2006

(51) Int. Cl.
F16D 31/02 (2006.01)

(52) U.S. Cl. .......................................... 60/475; 60/476

(58) Field of Classification Search .................. 60/473, 60/474, 475, 476
See application file for complete search history.

(56) References Cited

U.S. PATENT DOCUMENTS

| 3,772,889 | A  | * | 11/1973 | Mason et al. ............... 60/473 |
| 4,667,472 | A  | * | 5/1987  | Clay et al. .................. 60/475 |
| 6,477,835 | B1 | * | 11/2002 | Geiger ........................ 60/413 |
| 6,519,939 | B1 | * | 2/2003  | Duff ............................ 60/475 |
| 6,591,607 | B1 | * | 7/2003  | Baumgarten ............... 60/475 |
| 6,796,120 | B1 | * | 9/2004  | Franchet et al. ............ 60/475 |
| 6,889,501 | B1 | * | 5/2005  | Busch ......................... 60/475 |

* cited by examiner

*Primary Examiner*—Edward K. Look
*Assistant Examiner*—Michael Leslie
(74) *Attorney, Agent, or Firm*—Phillips Lytle LLP

(57) ABSTRACT

An electrohydraulic actuator (10) includes a fluid-powered actuator (11) having a piston (15) in a cylinder (16). The piston divides the cylinder into two opposed chambers (18, 19). The actuator includes a fixed-displacement reversible motor-driven pump (13) having a first port communicating with one of the chambers and having a second port communicating with the other of the chambers in a closed hydraulic system. A pre-charged accumulator (14) communicates with the pump first port. One of the actuator chambers is maintained at a fixed pre-charged pressure of the accumulator, and the operation of the pump controls the pressure in, and volume of, the other chamber.

6 Claims, 1 Drawing Sheet

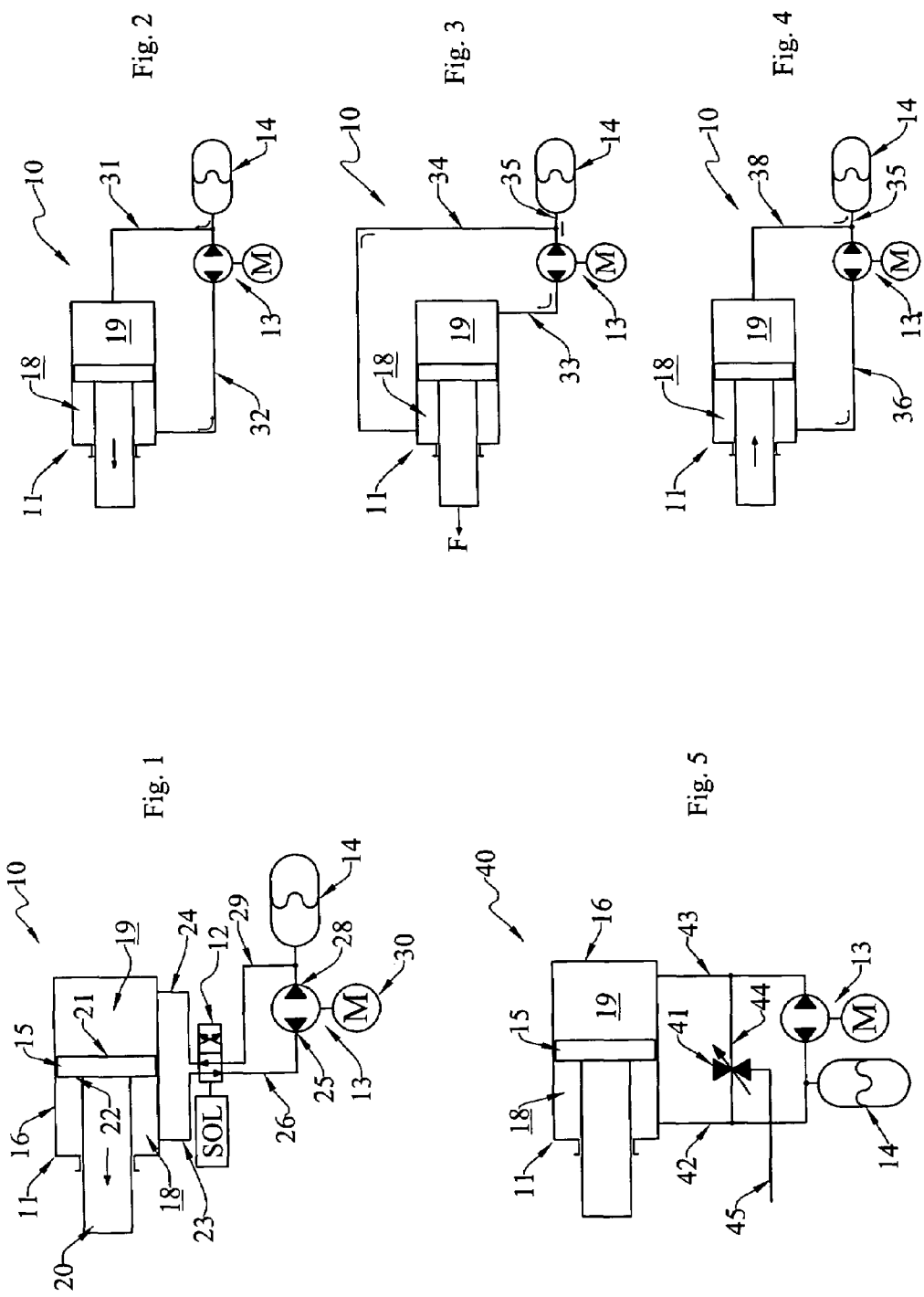

US 7,051,526 B2

CLOSED-SYSTEM ELECTROHYDRAULIC ACTUATOR

TECHNICAL FIELD

The present invention relates generally to electrohydraulic actuators for use in molding and casting apparatus, and, more particularly, to an improved closed-system electrohydraulic actuator that is particularly suited for use with a die-casting apparatus.

BACKGROUND ART

In certain molding and casting apparatus, two mold halves are adapted to be selectively moved toward and away from one another. In a conventional injection molding device, such as used to form many plastic articles, the mold halves are moved together to close the mold, and a mass of heated plastic material is forced into the mold to form the shape defined therein. After the article has been formed, the mold halves are opened to allow the object to be withdrawn.

In die-casting operations, material is quickly injected into an empty mold cavity. After the mold cavity initially fills, it is desired to pack the mold, by forcing the material into the mold with high force. On the other hand, when it is desired to remove the object, the mold halves must be quickly separated from one another.

It would be generally desirable to provide an improved electrohydraulic actuator for use in molding and casting operations, and, more particularly, for use with die-casting machines.

DISCLOSURE OF THE INVENTION

With parenthetical reference to the corresponding parts, portions or surfaces of the disclosed embodiment, merely for purposes of illustration and not by way of limitation, the present invention broadly provides an improved electromechanical actuator (10) that is particularly suited for use with, but not limited to, die-cast injection molding apparatus.

The improved actuator broadly comprises: a fluid-powered actuator (11) having a piston (15) in a cylinder (16), the piston dividing the cylinder into two opposed chambers (18, 19); a fixed-displacement reversible motor-driven pump (13) having a first port (25) communicating with a first of the chambers and having a second port (28) communicating with a second of the chambers in a closed hydraulic system; and a pre-charged fluid-containing accumulator (14) communicating with a pump port; whereby one of the chambers will be at the fixed pre-charged pressure of the accumulator, and the operation of the pump will control the pressure in, and volume of, the other of the chambers.

The piston may have equal-area surfaces facing into the chambers.

Alternatively, the piston may have unequal-area surfaces (21, 22) facing into the chambers. The chamber into which the larger-area piston surface faces is identified as the large-area chamber (19), and the chamber into which the smaller-area piston surface faces is identified as the small-area chamber (18).

The actuator may further include: an electrically-controllable valve, such as a four-way reversing valve (12), operatively arranged in parallel with the pump such that, even when the pump is not being operated, the valve may be selectively opened so that the accumulator may rapidly discharge fluid into the large-area chamber to extend the actuator at a high velocity. When the valve is closed, the pump may be operated in one direction to either retract the actuator and to charge the accumulator, or be operated in the opposite direction to develop increased extending force.

The valve may be a proportional flow control valve (41), and may control the velocity of the piston.

Alternatively, the valve may be arranged in parallel with the pump.

The actuator may be operatively arranged to selectively develop high force in one direction of piston movement relative to the cylinder when the pump controls the pressure of fluid in the large-area chamber, and to selectively develop high velocity in the opposite direction of piston movement relative to the cylinder when the pump controls the pressure of fluid in the small-area chamber.

Accordingly, the general object of the invention is to provide an improved closed-system electrohydraulic actuator.

Another object is to provide an electrohydraulic actuator that allows high-velocity low-force approach, followed by low-velocity high-force packing of a mold.

Another object is to provide an improved electrohydraulic actuator that is particularly suited for use with die-casting apparatus.

These and other objects and advantages will become apparent from the foregoing and ongoing written specification, the drawings and the appended claims.

BRIEF DESCRIPTION OF THE DRAWINGS

FIG. 1 is a schematic of a first form of the improved electrohydraulic actuator, showing the fluid-powered actuator, the solenoid-operated four-way reversing valve, the motor-driven pump, and the accumulator.

FIG. 2 is a reduced-scale simplified schematic showing the rapid advance of the actuator produced by the discharge of the accumulator when the solenoid valve is in the position shown in FIG. 1.

FIG. 3 is a reduced-scale simplified schematic of a high-force mode of operation when the motor is driven in the opposite direction.

FIG. 4 is a reduced-scale simplified schematic of a retract and recharge mode of operation.

FIG. 5 is a schematic view of a second form of an improved electrohydraulic actuator, this view depicting the fluid-powered actuator, the electrically-controllable proportional flow control valve, and the accumulator and motor-driven pump in parallel with the valve.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIG. 1 thereof, a first form of the improved electrohydraulic actuator is generally indicated at 10. This form is shown as broadly including a fluid-powered actuator 11, a solenoid-operated four-way reversing valve 12, a motor-driven pump 13, and an accumulator 14. The fluid-powered actuator includes a piston 15 mounted for sealed sliding movement in a cylinder 16 and subdividing the cylinder into a leftward chamber 18 and a rightward chamber 19. A rod 20 has its right marginal end fixed to the piston, and has an intermediate portion sealingly penetrating the left end wall of the cylinder. Thus, the piston has a large-area circular surface 21 facing rightwardly into chamber 19, and has a smaller-area annular surface 22 facing leftwardly into chamber 18. Because of the relative sizes of the piston faces 21, 22, chamber 19 is identified as the large-area chamber, and chamber 18 is identified as the small-area chamber.

Reversing valve 12 is a solenoid-operated four-way valve. The reversing valve communicates with chambers 18, 19 via conduits 23, 24, respectively.

The pump is a fixed-displacement reversible motor-driven pump having a first port 25 communicating with the solenoid valve via conduit 26, and a second port 28 communicating with the accumulator and with valve 12 via conduit 29. Motor 30 is arranged to drive pump 12 in either angular direction.

Accumulator 14 is filled with fluid, and is pneumatically pre-charged. It is schematically shown as having a diaphragm separating a pneumatic portion on the right side from a hydraulic portion on the left side.

The hydraulic system is closed in the sense that fluid is neither added nor withdrawn from outside the system. Rather, differential flow with respect to the fluid powered actuator is accommodated by the accumulator.

When the apparatus is in the condition shown in FIG. 1, the pump first and second ports 25, 28 communicate with actuator chambers 18, 19 via conduits 26, 23 and 29, 24, respectively. Thus, pump 12 may be rotated in one direction such that fluid is pumped from the collapsing small-area chamber, and is pumped to the expanding large-area chamber. In addition, the differential volume attributable to the differently-sized areas of the piston faces is supplied by fluid provided to or from the accumulator.

Alternatively, when the solenoid is operated so as to move the valve to the alternative position shown in FIG. 1, the first and second pump ports 25, 28 will communicate with actuator chambers 19, 18 via conduits 26, 24 and 29, 23, respectively. In this form, pressurized fluid from the accumulator, together with fluid provided by the pump, may be supplied to the expanding large-area piston chamber, and fluid may be withdrawn from the collapsing small-area piston chamber.

FIGS. 2–4 shown three distinct modes of operation of the structure shown in FIG. 1. In these figures, the reversing valve 12 has been omitted, and the conduits are arranged differently than shown in FIG. 1. However, this is done simply so that the reader may follow the flow paths more easily.

FIG. 2 shows a low-force rapid advance mode of operation. In this mode, the motor rotates the pump in one direction. Hence, fluid may flow from the accumulator through conduit 31 to the large-area piston chamber 19. At the same time, fluid may flow from the small-area piston chamber 18 through conduit 32 back to the motor. As noted before, the motor is operating in one direction, such that flow through the motor will be combined with whatever flow is supplied by the accumulator, so as to displace the actuator piston quickly to the left. This represents a rapid advance low-force mode of operation.

FIG. 3 is a schematic showing a high-force low-velocity mode of operation, as when it is desired to pack the mold. In this form, the pump is rotated in the direction opposite to that in which it was rotated in FIG. 2. Hence, fluid may be provided from the pump first port to the expanding large-area chamber via conduit 33. Fluid may be withdrawn from the collapsing small-area chamber 16 via conduit 34, and provided to the node in conduit 35 between the pump second port and the accumulator. Hence, the pump may displace such fluid as may be necessary to line 34 to control the movement and velocity of the piston.

FIG. 4 is a schematic of a retract and recharge mode, in which the actuator rod is moving to the right. In this mode, the pump is operated in the opposite direction that it was operated in FIG. 2. Hence, fluid is supplied by the pump first port via conduit 36 to the expanding small-area actuator chamber. Fluid in the collapsing large-area actuator chamber may flow via conduit 38 to the node in conduit 35 which extends between the pump second port and the accumulator. Since the flow of fluid in conduit 38 is greater than the flow in conduit 36 due to the different changes in volume of the actuator chambers, the differential flow will be supplied to the accumulator to recharge the same.

Thus, in the first form shown FIGS. 1–4, the electrohydraulic actuator is a closed hydraulic system in that fluid is not supplied to the system from an external source. Nor is fluid permitted to drain to an external sump. Rather, the accumulator is either discharged or recharged, as appropriate, to accommodate the differential fluid volumes.

FIG. 5 depicts a second form, generally indicated at 40, of the improved electrohydraulic actuator. This version also has a fluid powered actuator 11, an accumulator 14, and a motor-driven pump 13. However, in this form, the four-way reversing valve has been deleted, the accumulator has been placed in a position such that it is in constant communication with the small-area chamber, and an electrically-controlled proportional flow control valve 41 has been placed in parallel with the pump and the accumulator. Conduit 42 communicates the pump first port with small-area chamber 16, and conduit 43 communicates the pump second port with large-area chamber 18. The accumulator 14 communicates with conduit 42. Valve 41 is arranged in a branch conduit 44, which communicates with conduits 42 and 43. The electrical command to the valve is indicated by line 45. Thus, valve 41 is arranged in parallel with the pump and accumulator.

In the first form, the direction of pump rotation controlled the polarity of piston movement. The motor could be arranged in a closed-loop servosystem, and could be rotated at an appropriate speed to control the velocity of the piston movement.

In the second form, valve 41 may be used to control the velocity of the piston, at least during some modes of operation. The valve may be selectively opened to allow fluid from the accumulator, and any additional fluid provided by pump 12 (if operating), to flow into the actuator large chamber. While the accumulator also communicates with the small-area chamber, because of the differential areas of the piston, the actuator will extend (i.e., move leftwardly). The valve may be used to control the advance of the piston. When the valve is closed, the pump may be operated so as provide even greater pressure to the large-area chamber to increase the force exerted on the piston. The motor may be selectively rotated in the opposite direction so as to afford a quick retract and recharge of the accumulator.

Modifications

The present invention contemplates that many changes and modifications may be made. For example, the fluid-powered actuator may have rods extending leftwardly and rightwardly from the piston so that piston will have equal-area surfaces into the left and right chambers. The pump should be a fixed-displacement reversible motor-driven pump. The accumulator should be filled with fluid and pre-charged, and should communicate with one of the pump ports. In the first embodiment, if communicates with second port 28, whereas in the second form it communicates with first port 25. The valve may be either a four-way reversing valve, or may be a proportional flow control valve, as shown, or may be some other type of valve suitable for this purpose. The motor may be placed in a closed servo-loop to control the position or velocity of the actuator. Alternatively, the actuator may have one or more sensors (not shown) therein that are used to control its position and/or velocity.

Accordingly, while two forms of the improved electrohydraulic actuator have been shown and described, and several modifications thereof discussed, persons skilled in this art will readily appreciate that various additional changes and modifications may be made, without departing from the spirit of the invention as defined and differentiated by the following claims.

What is claimed is:

1. An electrohydraulic actuator, comprising:
    a fluid-powered actuator having a piston in a cylinder, said piston dividing said cylinder into two opposed chambers;
    a fixed-displacement reversible motor-driven pump having a first port communicating with a first of said chambers and having a second port communicating with a second of said chambers in a closed hydraulic system;
    a four-way reversing valve arranged in parallel with said pump; and
    a pre-charged fluid-containing accumulator communicating with said first pump port;
    whereby one of said chambers will be at the fixed pre-charged pressure of said accumulator, and the operation of said pump will control the pressure in, and volume of, the other of said chambers.

2. An electrohydraulic actuator set forth in claim 1 wherein said piston has unequal-area surfaces facing into said chambers, and wherein the chamber into which the larger-area piston surface faces is the large-area chamber and the chamber into which the smaller-area piston surface faces is the small-area chamber.

3. An electrohydraulic actuator set forth in claim 1, wherein said reversing valve is electrically-controllable such that, when said pump is not being operated, said valve may be selectively opened so that said accumulator may rapidly discharge fluid into said large-area chamber to extend said actuator at a high velocity, and, when said valve is closed, said pump may be operated in one direction to either retract said actuator and to charge said accumulator, or be operated in the opposite direction to develop increased extending force.

4. An electrohydraulic actuator as set forth in claim 3 wherein said valve is a proportional flow control valve.

5. An electrohydraulic actuator as set forth in claim 4 wherein said valve is operatively arranged to control the velocity of said piston.

6. An electrohydraulic actuator as set forth in claim 3 wherein said actuator is operatively arranged to selectively develop high force in one direction of piston movement relative to said cylinder when said pump controls the pressure of fluid in said large-area chamber, and to selectively develop high velocity in the opposite direction of piston movement relative to said cylinder when said pump controls the pressure of fluid in said small-area chamber.

* * * * *